J. HUDRY.
COMBINED VELOCIPEDE, GO-CART, AND SLED.
APPLICATION FILED MAR. 18, 1918.

1,274,045.

Patented July 30, 1918.
8 SHEETS—SHEET 1.

J. HUDRY.
COMBINED VELOCIPEDE, GO-CART, AND SLED.
APPLICATION FILED MAR. 18, 1918.

1,274,045.

Patented July 30, 1918.
8 SHEETS—SHEET 4.

J. HUDRY.
COMBINED VELOCIPEDE, GO-CART, AND SLED.
APPLICATION FILED MAR. 18, 1918.

1,274,045.

Patented July 30, 1918.
8 SHEETS—SHEET 5.

J. HUDRY.
COMBINED VELOCIPEDE, GO-CART, AND SLED.
APPLICATION FILED MAR. 18, 1918.

1,274,045.

Patented July 30, 1918.
8 SHEETS—SHEET 7.

J. HUDRY.
COMBINED VELOCIPEDE, GO-CART, AND SLED.
APPLICATION FILED MAR. 18, 1918.

1,274,045.

Patented July 30, 1918.
8 SHEETS—SHEET 8.

Inventor
John Hudry.

By
his Attorneys

UNITED STATES PATENT OFFICE.

JOHN HUDRY, OF HAZLETON, PENNSYLVANIA.

COMBINED VELOCIPEDE, GO-CART, AND SLED.

1,274,045.  Specification of Letters Patent.  Patented July 30, 1918.

Application filed March 18, 1918. Serial No. 223,132.

*To all whom it may concern:*

Be it known that I, JOHN HUDRY, a citizen of the United States, residing at Hazleton, in the county of Luzerne and State of Pennsylvania, have invented a certain new and useful Improvement in Combined Velocipedes, Go-Carts, and Sleds, of which the following is a full, clear, and exact description.

This invention relates to children's vehicles, and the object of the invention is to provide a combination vehicle for children, including a velocipede, a go-cart or sulky, and a sled, the parts of the vehicle being so combined that the vehicle may be used as a velocipede by a single child, as a combination velocipede and go-cart or sulky, so that the child on the velocipede may propel the vehicle and carry another child occupying the go-cart, or the go-cart may be utilized for carrying other articles, such as bundles, packages, etc.; or the front fork of the vehicle and its attached steering and driving wheel and the handle-bar may readily be removed or detached from the rear part of the vehicle, and the rear part of the vehicle used as an ordinary go-cart for pushing or pulling a child therein, the backbone of the vehicle serving as a handle for the go-cart; and by detaching the wheels from the frame of the go-cart, the go-cart may be used as a sled, either with or without the front steering and driving wheel.

A further object of the invention is to provide such a combination vehicle which may be folded into small compass for storage and transportation purposes.

This application may be considered as a continuation, in part, of my application filed September 13, 1915, Serial No. 50,419, patented March 13, 1917, No. 1,218,943.

The invention consists in a combined velocipede, go-cart and sled, and in the details of construction and combination of parts, all substantially as I will proceed now more particularly to set forth and finally claim.

In the accompanying drawings, illustrating the invention, in the several figures of which like parts are similarly designated, Fig. 3 is a top plan view, with the velocipede seat omitted, showing the go-cart partly collapsed, and the foot-rest in its elevated position. Fig. 19 is an enlarged detail view of another form of detachable connection for the go-cart wheels.

Referring to the drawings, Figs. 1 to 7, 1 is the front steering wheel, 2 the fork in which the wheel is mounted, and 3 the pedals, all of which may be of any usual or desired construction.

The fork is provided with the steering head 4 in which is detachably fitted the steering post 5 provided with a suitable handle bar 6.

As herein shown, the steering head 4 is provided with, preferably, a slightly downwardly curved and rearwardly projecting cylindrical stem 7, adapted to be detachably fitted into the tubular end 8 of the backbone and secured therein by a removable pin or bolt 8′, or any other suitable removable fastening. The backbone is preferably constructed as herein shown of two similar pieces 9, formed or connected at their upper ends in any suitable manner, with the tubular portion 8, and curved and diverging rearwardly and terminating at their lower ends in eyes, or provided with openings 10 to receive a connecting pin or other hinge member for hingedly connecting the backbone with the frame of the go-cart portion of the vehicle to be hereinafter described.

The backbone is provided with a seat 11, secured thereto in any suitable manner, as by a clamping member 12.

As shown in Figs. 1 to 7, the go-cart comprises a frame, consisting of a central bar 13 having attached to its forward end a hinge member 14 adapted to receive the pintle 15 for hingedly connecting the bar to the lower rear ends of the backbone, the said hinge member 14 entering between the ends of the parts of the backbone and serving as a brace or spacer for said ends.

The forward end of the central bar 13 adjacent to the hinge is provided or formed with an upwardly extended portion 16 having a slot 17 adapted to receive a turn-button 18 fixed to the backbone in any suitable manner, as by a clip 19, and adapted to pass through said slot when the backbone is moved to position of use, and then turned to prevent it from returning through the slot, to thereby rigidly lock the backbone in position for use, and to be turned so as to pass through the slot to permit the parts of the vehicle to be folded, as hereinafter described.

Pivoted to the rear end of the central bar 13, at 20, are the intermediate ends of a pair of lazy-tongs members 21, the intermediate ends of the other members 22 of said pair of lazy-tongs being pivotally fixed to a sliding piece 23 mounted upon the central bar 13 at its forward end, the pivot pin or bolt for connecting the ends of the lazy-tongs members and the sliding piece extending through a slot 24 in the central bar and provided with a butterfly nut 25, for tightening said parts in adjusted position.

The sliding piece 23 is provided with downwardly extending ears 26 upon opposite sides of the central bar 13 to which is pivoted a foot-rest to be described. Said sliding piece 23 is also provided with off-standing lugs 27 projecting beyond the opposite edges of the central bar and serve as stops for said foot-rest, as hereinafter explained.

Said central bar 13 is further provided at its rear end with an upstanding portion 28 having a notch 29 in its upper edge for a purpose presently appearing.

The members 21 and 22 of the pair of lazy-tongs are crossed and pivotally connected at 30, and the ends of the members 21 are fixedly pivoted to the undersides of brackets 31 secured to the side frames 32 and 33 at the front of the go-cart, while the ends of the lazy-tongs members 22 are slidably pivoted in slots 34 in the brackets 35 secured to the side frames 32, 33, at the rear of the go-cart. By this construction, it will be seen that the go-cart body or frame may be collapsed, as partly illustrated in Figs. 3 and 7, or may be extended for use, as illustrated in Figs. 1, 4, 5 and 6.

The side frames 32 and 33 of the go-cart are preferably constructed of two angular pieces of metal or other suitable material connected or riveted together at their ends and forming substantially rectangular frames, comprising upper and lower rails 36 and 37 respectively, and rearwardly inclined front and rear rails 38 and 39, respectively. As shown more clearly in Figs. 1, 2, 4 and 5, the lower rails 37 of the side frames are provided with rounded or upwardly curved ends 40, so that said rails may serve as sled runners when it is desired to use the vehicle as a sled by removing the wheels of the go-cart.

The upper rails 36 of the side frames, at their rear ends, are provided with inwardly projecting right-angled extensions 41 and 42 upon opposite sides of the vehicle, and a connecting or stay rail or member 43 is pivoted to the right-angled extension 41 at one end and is provided with a notched right-angled extension 44 at its other or free end adapted to enter and interlock with a notch 45 formed in the right-angled extension 42 on the opposite upper rail 36 of the frame, and thus serves to hold and support the frame in its extended position, said stay rail or member 43 also serving as a back-rail for the frame of the go-cart.

Secured to the upper sides of the brackets 31 at the front of the go-cart frame, are spring members 46, consisting of flat strips or pieces of spring metal, bent as at 47, to form off-set portions 48 to receive the rivets or other fastenings by which the springs are secured to the brackets 31, said springs extending along and parallel with the side frames and extending to the rear of the frames and a sufficient distance above the lazy-tongs members and their connections with the side frames to permit of a spring action under the load of the occupant of the go-cart.

Figure 6:
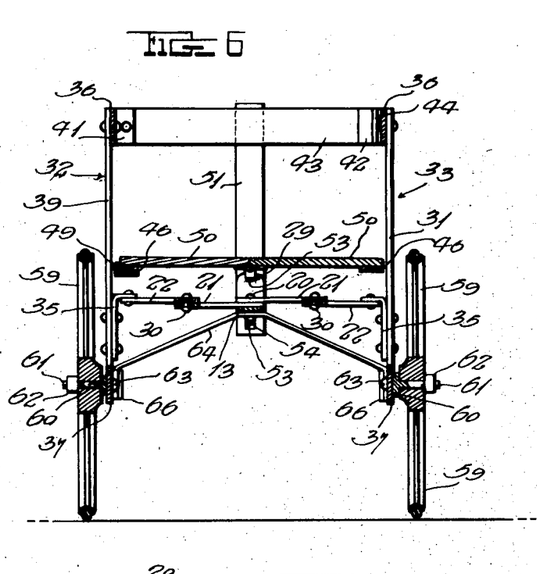
Fig. 6 is a transverse vertical section, taken substantially in the plane of line 6—6, Fig. 2, and looking in the direction of the arrows, and showing the addition of a brace for the lower part of the go-cart frame.
Figure 7:
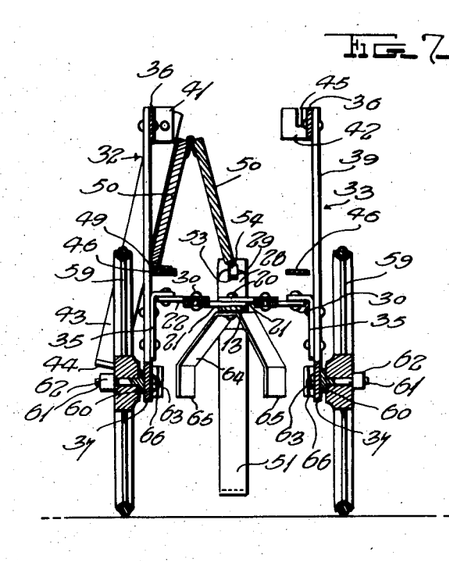
Fig. 7 is a vertical transverse section of the go-cart, partly collapsed, and looking toward the rear, and showing the seat partly folded and the lower brace member partly turned away from the side frame.

Secured to one of the springs 46 by means of hinges 49 (see particularly Figs. 4, 5, 6 and 7) is a seat member 50, and as shown, said seat is divided and hinged longitudinally of the vehicle, so that when the body of the go-cart is collapsed, it will fold upon itself, as shown more particularly in Fig. 7, and when the go-cart frame is extended for use, the free edge of the seat rests upon the opposite spring 46 and engages the adjacent end rails of the side frame and serves as an additional brace or stay for maintaining the go-cart body in its extended position.

A back-stop 51 is pivoted to the upstanding portion 28 of the central bar 13, and is provided with a sliding latch 52, provided with spaced lugs 53 passing through a slot 54 in the back-stop 51, and adapted to engage the notch 29 in said upstanding part 28, to lock the back-stop in its positions of use and disuse. That is to say, when the vehicle is to be used as a velocipede, or as a combined velocipede and go-cart, the back-stop 51 is turned to its upward position with the latch removed from the notch 29 and pulling the latch into the notch when the back-stop is in its proper upward position, as shown in Figs. 1, 2, 5 and 6; and when the vehicle is to be used as a go-cart by removing the front fork and steering wheel, the back-stop is reversed or turned to its downward position, as shown in Fig. 4, by manipulating the latch to unlock and again lock said back-stop in its down position.

Pivoted to the ears 26 of the sliding piece 23 on the central bar 13, is a foot-rest, preferably comprising the substantially rectangular foot-pieces 55 having upwardly extending arms 56 by which they are pivoted to said ears 26, said arms being connected by a stay piece 57. The ends of said arms 56 are preferably rounded and adapted to engage the offstanding lugs 27 of said sliding piece 23 and serve as stops to limit the downward movement of the foot-rest, and maintain it in an inclined position, so that the occupant's feet may readily engage the bottom rails of the foot-rest.

Figures 5, 13, 14, 18, 18A:
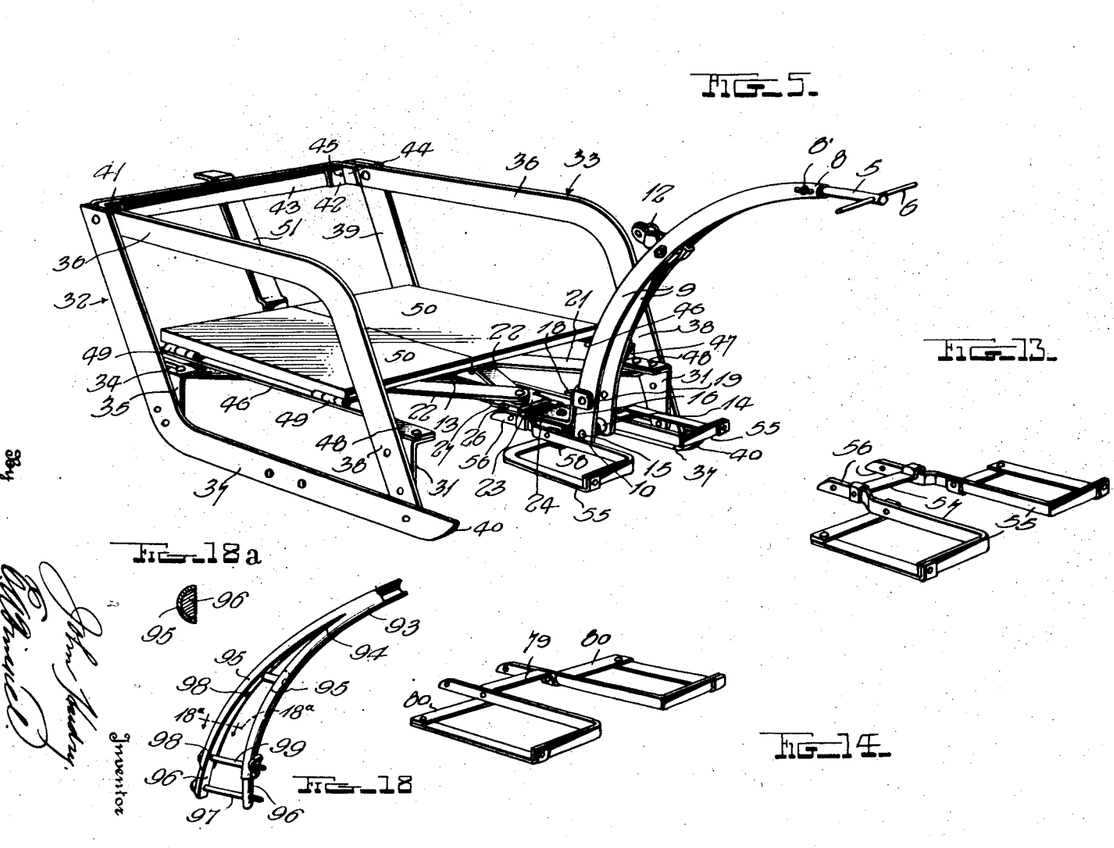
Fig. 5 is a perspective view of the go-cart detached, with the wheels removed, for use as a sled.
Fig. 14 is a perspective of another form of foot-rest.
Fig. 18 is a perspective view of a modified form of backbone and adjustable connection, with the go-cart, and Fig. 18ª an enlarged cross-section of the sliding connection, taken substantially in the plane of line 18ª, Fig. 18.

In order to maintain or hold the foot-rest in its raised position, as when it is not desired to use the same, a turn-button or catch 58 is pivoted to the underside of the center bar 13, and adapted to engage the inner side bars of the foot-rest, to lock and support it in its raised position when not to be used, as shown in Figs. 3 and 5.

Figures 4, 11, 12, 13:
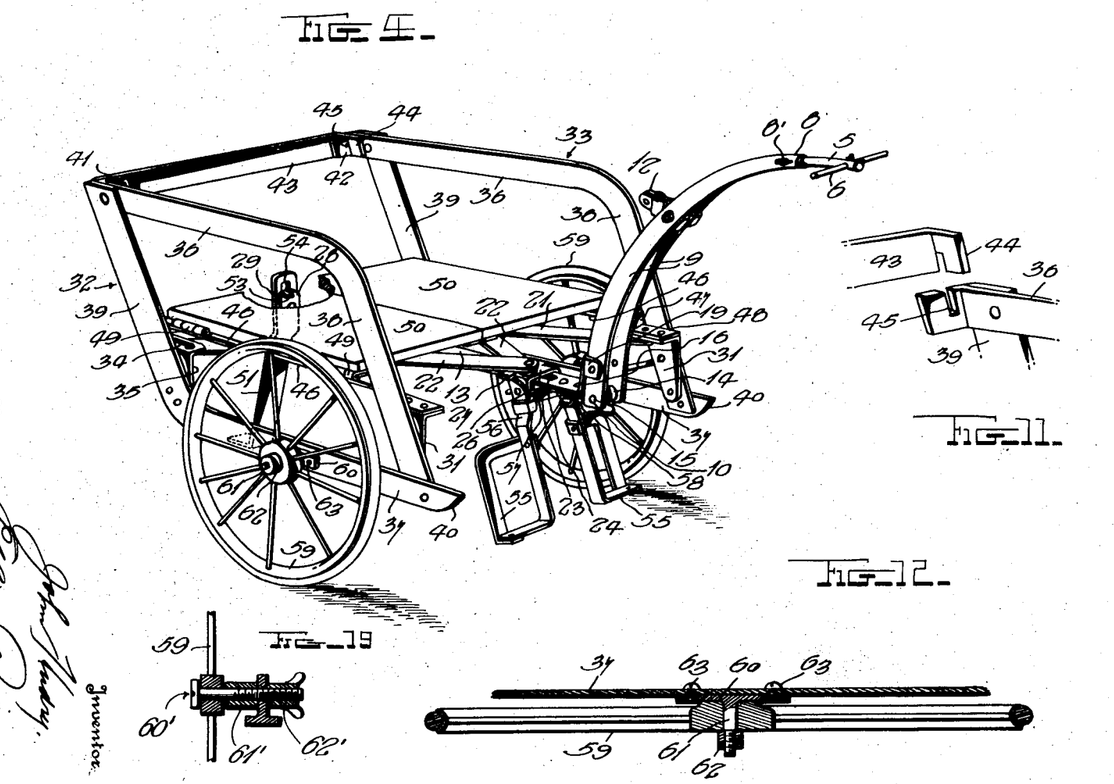
Fig. 4 is a perspective view of the go-cart detached and in position for use.
Fig. 11 is an enlarged detail perspective view of the fastening for the pivoted back rail or brace for the go-cart frame.
Fig. 12 is an enlarged sectional view of the detachable wheel and its fastenings.
Fig. 13 is a perspective view of one form of foot-rest.

The wheels 59 of the go-cart are mounted upon stub-axles fastened about centrally to the outer sides of the bottom rails 37, and as shown in Fig. 12 said stub-axles are preferably constructed of a base piece 60 having the axle-nib 61 projecting centrally therefrom and screwthreaded at its outer end to receive a nut 62 for securing the wheel in place upon the axle-nib. The stub-axle may be detachably secured to the bottom rails of the frame, as by screws or bolts 63, passing through the rails and engaging the base piece 60, or the stub-axles may be constructed and fastened in place in any other suitable manner, so long as they and the wheels may readily be detached from the go-cart frame, when it is desired to use the vehicle as a sled; or as shown in Fig. 19, where T-iron is used for the bottom rails of the go-cart frame, the wheels 59 may be attached to the rails by means of a bolt 60' passing through the hub of the wheel and threaded into the upstanding flange of the T-iron rail, with a spacing collar 61' interposed between the hub and rail, and a suitable lock-nut 62' screwed upon the inner end of the bolt.

In Figs. 6 and 7 is shown an additional stay member for bracing the side frames, consisting of an arched strip of metal 64 pivoted to the under side of the central bar 13, and having its ends 65 bent into a substantially vertical plane, and adapted to engage cleats or brackets 66 fixed to the inner sides of the bottom rails 37, and thus serve as an additional brace for holding the side frames in their extended condition. When it is desired to collapse the body of the go-cart, this additional brace may be disengaged from the cleats 66 and turned upon its pivot, as shown in Fig. 7, and in parallelism with the frame, thus permitting collapsing of the go-cart frame.

Figures 8, 9:
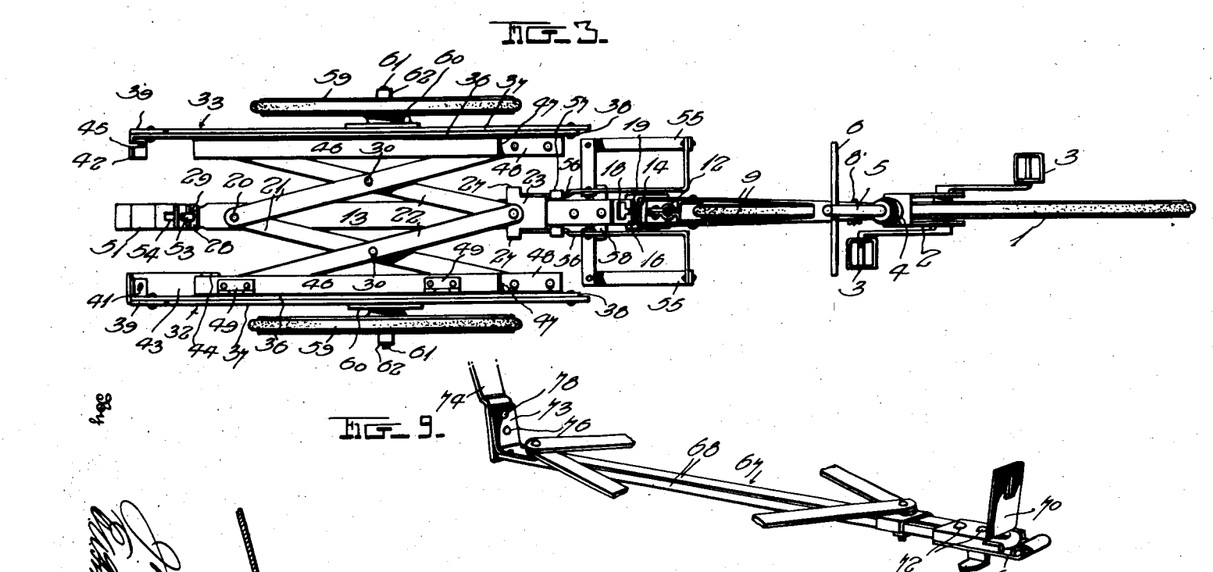
Fig. 8 is a detail perspective view of the center bar of the go-cart frame, and a portion of the backbone, and connections, the parts being disassembled.
Fig. 9 is a perspective view of a modified form of center bar and connections for the go-cart frame.
Figure 8:
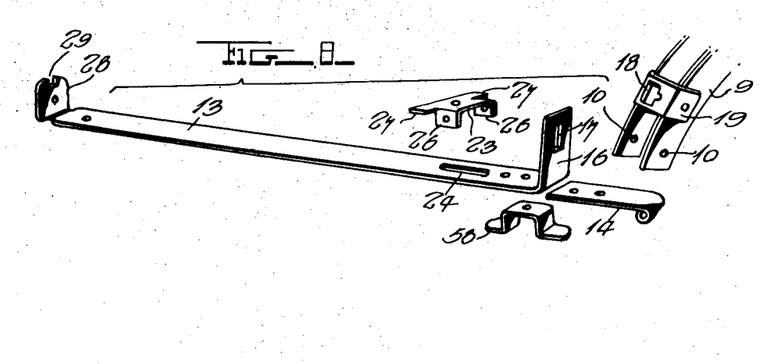
Figure 10:
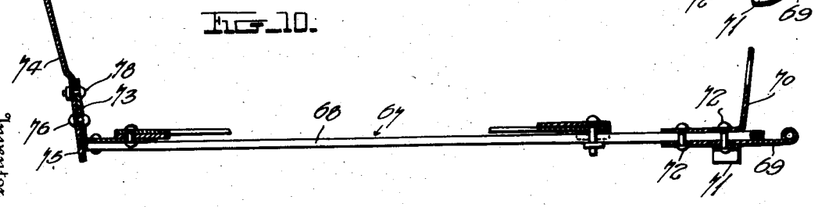
Fig. 10 is a central longitudinal section thereof.

In Figs. 9 and 10, I have shown a modified form of central bar for the go-cart frame, consisting of a piece of wire 67 bent upon itself to form the spaced parallel bars 68, and having secured thereto at its forward end the hinge plate 69 and the upstanding slotted locking plate 70, and the foot-rest supporting turn-button 71, all of which parts are fixed to the bar by means of rivets 72 passing between the bars 68. At the rear end of the bar, is secured, as by riveting, the upstanding bracket 73 to which is pivoted the back-stop 74; and in this form of the device, the back-stop is provided with perforations 75 upon opposite sides of its pivot 76, adapted to register with a perforation 77 in the upstanding bracket 73 and adapted to receive a removable bolt 78 or other fastening which may readily be removed, so that the back-stop 74 may be turned upon its pivot to place it in position for use when the rear part of the vehicle is separated and used as a go-cart, or turned up against the back of the go-cart when the parts of the vehicle are attached and to be used as a velocipede.

Figures 15, 16:
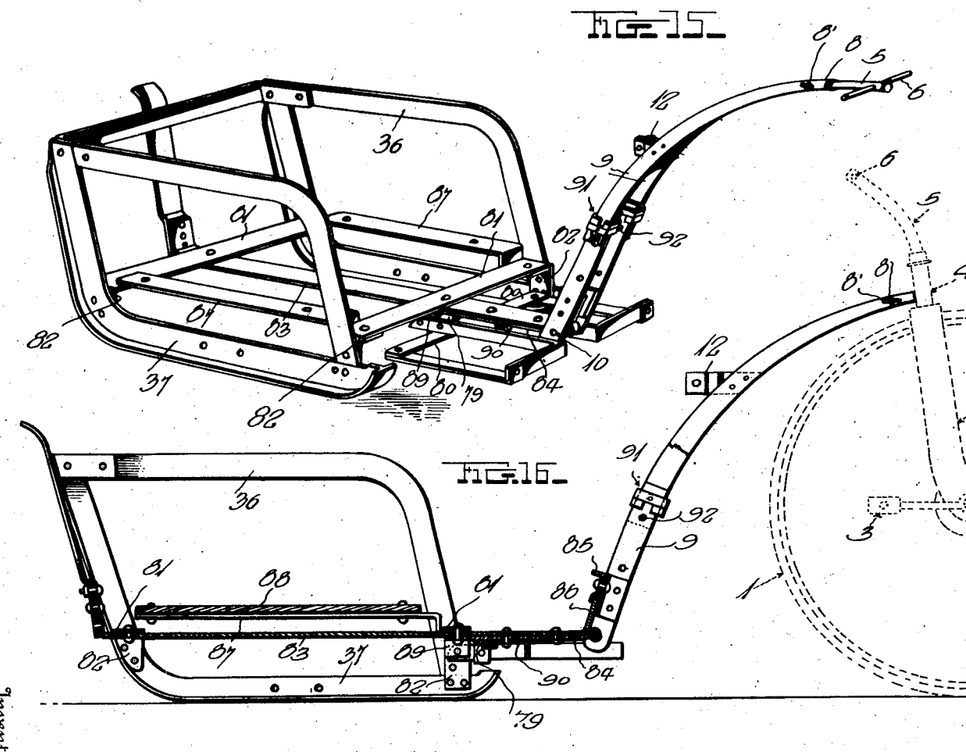
Fig. 15 is a perspective view of a modified form of go-cart frame, and showing an extensible backbone.
Fig. 16 is a central vertical longitudinal section thereof, showing the backbone extended.

In Fig. 13, I have shown the form of foot-rest applied to the vehicle illustrated in Figs. 1 to 7, and in Fig. 14, is shown another form of foot-rest, in which the stay piece 79 for connecting the two members of the foot-rest is made integral with the upper connecting pieces 80 of the foot-pieces, and this form of foot-rest is shown as applied to the modified form of go-cart shown in Figs. 15 and 16.

In said Figs. 15 and 16, I have shown a modified form of go-cart frame, wherein the body is rigid instead of collapsible as in the other views, and comprises the side frames similar in construction to those in the other views, and as hereinbefore described, and connected at their front and rear ends at the bottom, by cross-rails 81 having angled ends 82 riveted to the side frames, and riveted at their centers to the center bar 83, having a back-stop, such as that shown in Figs. 10 and 11 at its rear end, and said bar 83 projecting beyond the front cross-rail 81 and provided with the hinge plate 84 riveted thereto and to which the backbone is hingedly connected, as hereinbefore described, and having a modified form of locking device, consisting of a pivoted latch 85 secured to the cross-bar of the backbone, and adapted to engage the upper edge of the upstanding end 86 of the central bar 83 to lock the backbone in position of use, and to be turned out of engagement therewith to permit the folding of the backbone. This form of the go-cart is also provided with springs 87 secured to the front cross-rail and extending to the rear of the go-cart frame and adapted to support a rigid seat member 88 riveted thereto upon both sides of the cart. So also this form of the go-cart, is provided with a foot-rest pivoted to a bracket 89 riveted to the under side of the front cross-rail, and a pivoted latch 90 is secured to the under side of the central bar and adapted to engage the connecting bar or stay piece 79 of the foot-rest to hold the foot-rest in its elevated position when the cart is to be used as a sled, as illustrated in said Figs. 15 and 16.

As shown in said Figs. 15 and 16, the bottom rails of the go-cart frame are constructed of T-iron, so as to afford a broader bearing surface to serve as runners when the go-cart is to be used as a sled.

If desired the vehicle may be so constructed that when the wheels are detached for use as a sled, it may be propelled by the velocipede wheel, and to provide for the difference in wheel depth by the removal of the go-cart wheels, the backbone may be made in sections and provided with an interlocking slidable connection, as at 91, Figs. 15 and 16, and a removable connecting cross-bolt 92 adapted to pass through registering perforations in the overlapping parts of the slidable connection, to lock the parts of the backbone in their adjusted positions.

As shown in Figs. 18 and 18ª, the backbone instead of being constructed of separate pieces, as in the other views, may be constructed of a single piece of tubing 93, having its lower end split longitudinally as at 94 and spread apart to form the diverging semicircular ends 95, 95, adapted to fit and capable of adjustment upon a connecting yoke, comprising two curved pieces of metal 96, 96, connected together and slightly spaced apart or separated at their upper ends by a suitable bolt and spacer, as at 97, and diverging toward their lower ends and adapted to be hingedly connected with the hinge member of the center bar of the go-cart frame by the bolt or hinge pin 97, as before. The pieces 96 are provided with holes 98 near their upper and lower ends adapted to receive a removable fastening bolt 99 passing through holes in the forked ends of the backbone, whereby the backbone may be adjusted when desired to use the go-cart as a sled with or without the front propelling wheel. When it is desired to use the cart as a sled and to propel it by the front steering and driving wheel, it is simply necessary to adjust the backbone to its extended position, to thereby provide for the difference in wheel depth due to the removal of the wheels of the go-cart, and thus maintain the sled in proper relation to the front driving and steering wheel.

Figure 17:
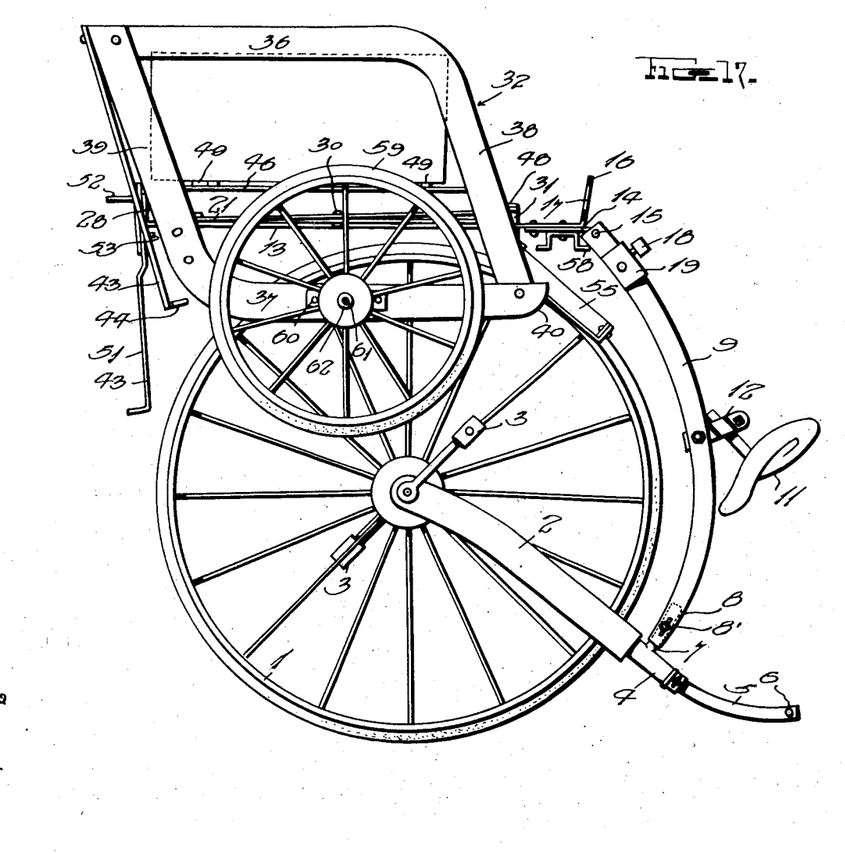
Fig. 17 a side elevation showing the vehicle folded.

The vehicle as a whole or when all of its parts are assembled, may be folded by simply turning the turn-button or catch at the connection between the backbone and the go-cart frame so that it will disengage the fastening plate on the go-cart frame and folding the backbone and its attached wheel downwardly under the go-cart until the front wheel approaches the underside of the go-cart frame, and collapsing the go-cart frame by pressing the side frames inwardly, the connecting back-rail at the top having been disengaged from the side frame and turned upon its pivot to lie substantially in the plane of the side frame to which it is pivoted, all as shown in Fig. 17, the front wheel entering the space between the wheels of the collapsed go-cart body. As thus folded, the vehicle may conveniently be transported or carried from place to place, and occupies little space when stored away or packed for transportation.

Figure 1:
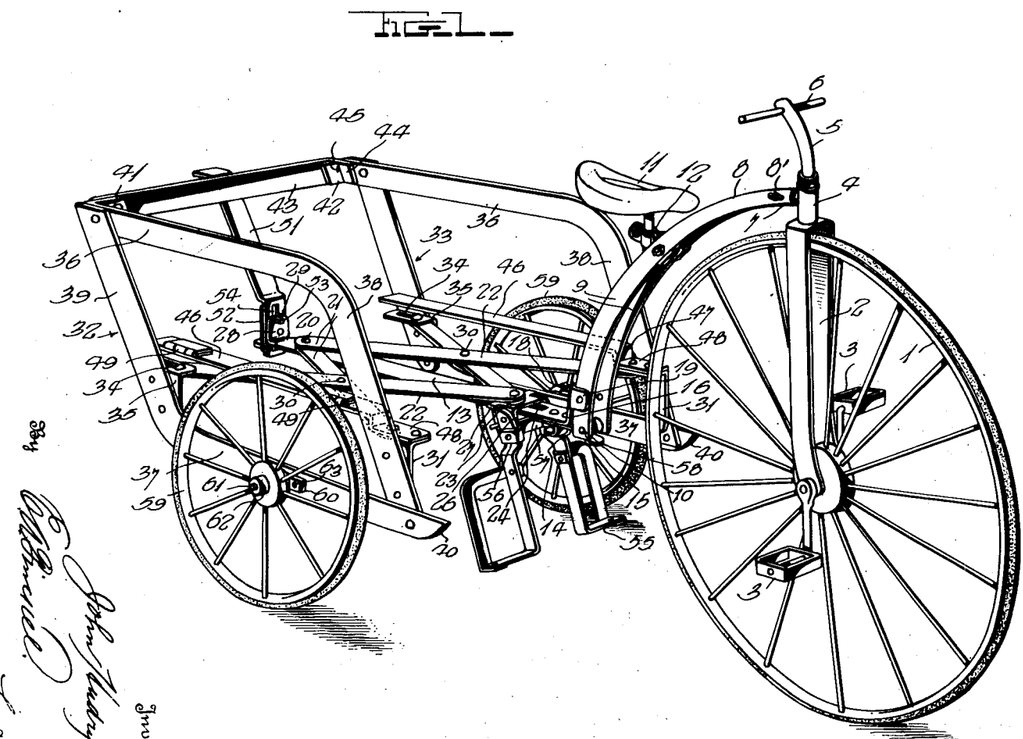
Figure 1 is a perspective view of the combined vehicle, in position for use, the seat being omitted from the go-cart to expose the connecting members for the side frames of the go-cart.
Figure 2:
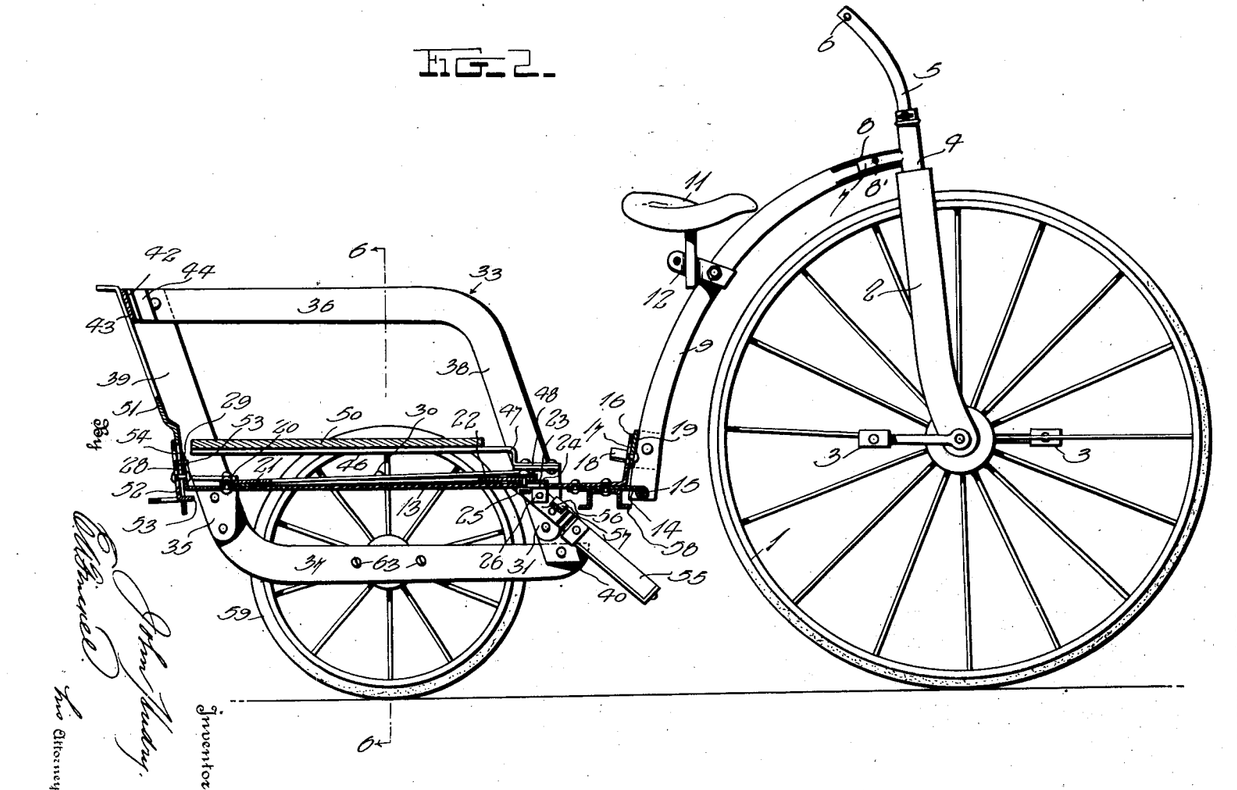
Fig. 2 is a side view, showing the rear part of the vehicle and the backbone in vertical longitudinal section, the front and steering wheel being in elevation.

The operation and use of the vehicle is obvious from the drawings and the above description, but it might be stated that when the vehicle is to used as a combined velocipede and go-cart or sled, the body of the go-cart will be extended, the back-stop reversed and locked in its upward position, and the foot-rest lowered so that the occupant of the go-cart may rest his feet therein, all as shown in Fig. 1, the occupant of the velocipede propelling the vehicle by the usual operation of the pedals. When the vehicle is to be used as a bicycle by a single child, the back-rail is released from its connection with the side frame, the foot-rest raised and locked in its up position, and the body of the go-cart collapsed to its fullest extent, thus bringing the wheels of the go-cart close together so that the wheels of the go-cart are practically the same as a single wheel, and thus converting the vehicle into a bicycle.

When it is desired to use the vehicle as a go-cart only, the velocipede seat is removed, the handle-bar and its post, and the backbone are detached from the steering head by removing the detachable fastening pins or bolts, and the handle-bar post fitted into the end of the backbone and secured therein by the fastening pin or bolt, and the back-stop latch released and the back-stop reversed to its downward position, as shown in Fig. 4, and the cart is then ready to be occupied by the child, and the cart readily pulled or pushed and manipulated by another grasping the handle. The vehicle as thus rigged up may be used as a sled, by simply removing the wheels from the stub-axles, or preferably, by removing the fastenings of the stub-axles from the side frames and thus removing the axles and wheels and making a more sightly appearance, as shown in Fig. 5, and also as shown in the modified form of vehicle shown in Figs. 15 and 16. When thus used as a sled, the back-stop is reversed and locked in its upward position, the foot-rest raised and locked in its elevated position out of the way, as clearly shown in the views referred to, so that the vehicle may be drawn over the ground, the bottom rails of the side frames serving as runners.

It is to be understood that the invention is not limited to the exact details of construction of the parts of the vehicle herein shown and described, as the same may be altered in various particulars, and still be within the scope of the appended claims.

What I claim is:

1. A combined velocipede and go-cart, comprising a front fork and a driving and steering wheel mounted therein, a steering head on said fork, a go-cart body and wheels for supporting the same, a backbone hingedly connected to said go-cart body and adapted to be detachably connected with the steering head on said fork, whereby the fork and its attached wheel may be disconnected from the backbone and the rear part of the vehicle used as a go-cart, the backbone serving as a handle for the same.

2. A combined velocipede and go-cart, comprising a front fork and a driving and steering wheel mounted therein, a steering head on said fork, and a steering post and handle-bar removably mounted in said steering head, a go-cart body and wheels for supporting the same, a backbone hingedly connected to said go-cart body and adapted to be detachably connected with the steering head on said fork, whereby the fork and its attached wheel may be disconnected from the backbone, and the handle bar and its post detached from said steering head and fitted into the end of said backbone, and the rear part of the vehicle used as a go-cart, the backbone and the attached handle bar serving as a handle for manipulating the go-cart.

3. A combined velocipede and go-cart, comprising a front steering and driving wheel, a fork in which said wheel is mounted, a steering head on said fork, a handle bar fitted in said steering head, a go-cart frame and wheels for supporting the same, a backbone hinged to said go-cart frame, means for locking the backbone and go-cart in position of use, means for detachably connecting the backbone with the steering head on said fork, the said backbone adapted to be unlocked and folded backward with the driving and steering wheel entering between the wheels of the go-cart.

4. A combined velocipede and go-cart, comprising a front fork and a driving and steering wheel mounted therein, a steering head on said fork having a rearwardly extending projection, a handle bar detachably mounted in said steering head, a go-cart frame and wheels for supporting the same, a backbone having its rear end hingedly connected to the go-cart frame and terminating at its forward end in a tubular portion adapted to be detachably connected with the rearwardly extending projection on the steering head, whereby the front fork and its attached wheel may be disconnected from the backbone and the handle bar removed from the steering head and inserted in the tubular end of the backbone, and the rear part of the vehicle used as a go-cart.

5. A combined velocipede and go-cart, comprising a front fork and a driving and steering wheel mounted therein, a steering head on said fork having a rearwardly extending projection, a handle bar detachably mounted in said steering head, a go-cart frame and wheels for supporting the same, a backbone having its rear end hingedly connected to the go-cart frame and terminating at its forward end in a tubular portion adapted to be detachably connected with the rearwardly extending projection on the steering head, whereby the front fork and its attached wheel may be disconnected from the backbone and the handle bar removed from the steering head and inserted in the tubular end of the backbone, and the rear part of the vehicle used as a go-cart, and a backstop pivoted to the rear of the go-cart frame and adapted to be turned in an up or down position.

6. A combined velocipede and go-cart, comprising a front fork and a driving and steering wheel mounted therein, a steering head on said fork having a rearwardly extending projection, a handle bar detachably mounted in said steering head, a go-cart frame and wheels for supporting the same, a backbone having its rear end hingedly connected to the go-cart frame and terminating at its forward end in a tubular portion adapted to be detachably connected with the rearwardly extending projection on the steering head, whereby the front fork and its attached wheel may be disconnected from the backbone and the handle bar removed from the steering head and inserted in the tubular portion of the backbone, and the rear part of the vehicle used as a go-cart, a backstop pivoted to the rear of the go-cart frame and adapted to be turned in an up or down position, and means for locking the back-stop in either its up or down position.

7. A combined velocipede and go-cart, comprising a front fork and a driving and steering wheel mounted therein, a steering head on said fork having a rearwardly extending projection, a handle bar detachably mounted in said steering head, a go-cart frame and wheels for supporting the same, a backbone having its rear end fixed to the go-cart frame and terminating at its forward end in a tubular adapted to be detachably connected with the rearwardly extending projection on the steering head, whereby the front fork and its attached wheel may be disconnected from the backbone and the handle bar removed from the steering head and inserted in the tubular end of the backbone, and the rear part of the vehicle used as a go-cart, a back-stop pivoted to the rear of the go-cart frame and adapted to be turned in an up or down position, means for locking the back-stop in either its up or down position, a foot-rest pivoted to the front of the go-cart frame and adapted to be adjusted to positions of use and disuse, and means for locking the foot-rest in its position of disuse.

8. A combined velocipede and go-cart, comprising a front fork and a driving and steering wheel mounted therein, a steering head on said front fork, a handle bar detachably fitted in said steering head, a go-cart frame comprising a central bar and side frames, lazy-tongs members connecting said central bar and side frames, whereby said go-cart frame may be collapsed laterally, and a back-rail pivoted to one of the side frames and detachably engaging the other side frame to hold the side frames in their extended position, and a backbone connected to the central bar at its rear end and detachably connected at its forward end with the steering head of the front fork, whereby the rear part of the vehicle may be disconnected from the front fork and used as a go-cart, the said backbone serving as a handle therefor.

9. A combined velocipede and go-cart, comprising a front fork and a steering and driving wheel mounted therein, a handle bar connected to said front fork, a go-cart frame comprising a central bar, side frames, lazy-tongs members connecting the side frames with said central bar, a back-rail pivoted to one of said side frames and detachably engaging the other side frame for holding the side frames in extended position, spring members connected to the side frames and extending along the inner sides thereof, and a foldable seat hinged to one of said spring members and adapted to rest upon the other spring member when the go-cart is extended, and a backbone connected to said central bar at its rear end and having its forward end detachably connected to said front fork, whereby the front fork and its attached steering and driving wheel may be disconnected from the backbone and the rear part of the vehicle used as a go-cart, the backbone serving as a handle therefor.

10. A combined velocipede and go-cart, comprising a front fork, a steering and driving wheel mounted therein, a handle bar fitted in said fork, a go-cart frame comprising side frames and means for connecting the same, a backbone connected at its rear end to said go-cart frame and detachably connected at its forward end to said front fork, wheels detachably connected to the side frames of the go-cart, the rear part of the vehicle adapted to be disconnected from the front fork and used as a go-cart, the backbone serving as a handle therefor, the wheels detached from the side frames and the go-cart used as a sled, the bottom rails of the side frames serving as runners.

11. A combined velocipede and go-cart, comprising a front fork, a steering and driving wheel mounted therein, a handle bar fitted in said fork, a go-cart frame comprising side frames and means for connecting the same, a backbone connected at its rear end to the go-cart frame and detachably connected at its forward end to said front fork, stub-axles detachably connected to the side frames, wheels mounted on said stub-axles, the rear part of the vehicle adapted to be disconnected from the front fork and used as a go-cart, the backbone serving as a handle therefor, and the stub-axles and wheels thereon detached from the side frames and the go-cart used as a sled, the bottom rails of the side frames serving as runners.

12. In a combined velocipede, go-cart and sled, a front fork and a driving and steering wheel mounted therein, a handle bar detachably mounted in said fork, a go-cart frame, comprising side frames including upper and lower rails, wheels detachably connected to the lower rails of the go-cart frame, a backbone having a tubular upper end adapted to be detachably connected with the front fork and a bifurcated lower end adapted to be adjustably connected with the go-cart frame, whereby the fork and its attached front wheel may be detached from the backbone, the handle-bar removed from the fork and secured in the upper end of the backbone, and the rear part of the vehicle used as a go-cart, and the wheels detached from the go-cart and used as a sled, the bottom rails of the side frames serving as runners, the backbone and handle-bar serving as means for manipulating the vehicle, the said backbone adapted to be adjusted so that the front fork and driving wheel may be attached thereto for use in propelling the sled.

13. In a combined velocipede, go-cart and sled, a front fork and a driving and steering wheel mounted therein, a go-cart frame, comprising side members having bottom rails constructed of T-iron, wheels detachably connected to said bottom rails, a backbone connected to said go-cart frame and detachably connected to the front fork, whereby the front fork and its attached driving and steering wheel may be detached from the backbone and the rear part of the vehicle used as a go-cart, and the wheels detached and the go-cart used as a sled, the bottom rails of said go-cart frame serving as runners, and the backbone serving as a handle for either form of the vehicle.

14. A combined velocipede and go-cart, comprising a front fork and a driving and steering wheel mounted therein, a handle bar fitted in said fork, a go-cart frame comprising side frames and means for connecting the same, and an extensible backbone connected at its rear end with the go-cart frame and detachably connected at its forward end with the front fork, and wheels detachably connected to the side frames of the go-cart, the said wheels adapted to be detached from the side frames and the backbone extended and the go-cart used as a sled and propelled by the front steering and driving wheel.

15. A combined velocipede and go-cart, comprising a front fork and a driving and steering wheel mounted therein, a handle bar fitted in said fork, a go-cart frame comprising a central bar and sides frames, lazy-tongs members connecting said central bar and side frames, whereby said go-cart frame may be collapsed laterally, a back-rail pivoted to one of the side frames and detachably engaging the other side frame to hold the side frames in their extended position, an arched brace pivoted to the central bar and adapted to engage the bottom rails of the side frames to aid in holding the frames in their extended position, and a backbone detachably connecting the go-cart frame and the front fork.

In testimony whereof, I have hereunto set my hand this 6th day of March, 1918.

JOHN HUDRY.

Witnesses:
WILLIAM KRAMER,
GEORGE W. BROWNSON.